United States Patent [19]

Burin

[11] Patent Number: 4,939,521

[45] Date of Patent: Jul. 3, 1990

[54] DUAL HORN, MULTI-BAND RADAR DETECTOR

[75] Inventor: Marian M. Burin, Mississauga, Canada

[73] Assignee: B.E.L-Tronics Limited, Mississauga, Canada

[21] Appl. No.: 242,536

[22] Filed: Sep. 12, 1988

[30] Foreign Application Priority Data

Dec. 23, 1987 [CA] Canada .................. 555195

[51] Int. Cl.$^5$ .................. G01S 7/42; G01S 13/50; H05K 11/02
[52] U.S. Cl. .................. 342/20; 455/318; 455/319; 455/228
[58] Field of Search .................. 342/20; 455/226-228, 455/318, 319

[56] References Cited

U.S. PATENT DOCUMENTS

| | | |
|---|---|---|
| 3,550,008 | 12/1970 | Bright . |
| 4,182,990 | 1/1980 | Coffin et al. . |
| 4,190,838 | 2/1980 | Kemp .................. 342/20 |
| 4,196,393 | 4/1980 | Schweitzer .................. 340/600 |
| 4,213,130 | 7/1980 | Vaessen . |
| 4,280,223 | 7/1981 | Roettele et al. . |
| 4,313,216 | 1/1982 | Jaeger et al. .................. 455/226 |
| 4,315,261 | 2/1982 | Mosher .................. 342/20 |
| 4,318,103 | 3/1982 | Roettele et al. . |
| 4,571,593 | 2/1986 | Martinson .................. 343/783 |
| 4,613,989 | 9/1986 | Fende et al. .................. 455/351 |
| 4,625,210 | 11/1986 | Sagl .................. 342/20 |
| 4,626,857 | 12/1986 | Imazeki .................. 342/20 |
| 4,630,054 | 12/1986 | Martinson .................. 342/20 |
| 4,639,731 | 1/1987 | Karlsson et al. .................. 342/147 |
| 4,691,379 | 9/1987 | Shizume .................. 455/319 |
| 4,700,191 | 10/1987 | Manor .................. 342/20 X |
| 4,709,407 | 11/1987 | Baba .................. 342/20 X |
| 4,743,908 | 5/1988 | Brassfield et al. .................. 342/113 |
| 4,750,215 | 6/1988 | Biggs .................. 342/20 X |
| 4,791,420 | 12/1988 | Baba .................. 342/20 |

OTHER PUBLICATIONS

Hislop A., "An 88-100 GHz Receiver Frontend", IEEE Conf.-1979 MTT-S International Microwave Symposium Digest (Apr. 30-May 2, 1979), pp. 222-223.

Primary Examiner—Thomas H. Tarcza
Assistant Examiner—John B. Sotomayor
Attorney, Agent, or Firm—Donald E. Hewson

[57] ABSTRACT

The invention concerns a radar detection device—particularly a radar detection for police radar—which is improved with regard to undesirable microwave emissions therefrom. For the X-band and the K-band, for example, two horn antennae are provided, each associated with a local oscillator. A mixer is provided to mix signals from each horn antenna and from its respective local oscillator. Each antenna is made specific to radar signals within its respective band, and precautions are taken to avoid emission of K-band radiation from the larger X-band horn. For example, a bandpass filter for X-band radiation may be used in a feed line branch to the mixer from the X-band horn. The K-band radiation may be fed through in a feed line branch approaching the mixer from an opposed direction.

7 Claims, 1 Drawing Sheet

DUAL HORN, MULTI-BAND RADAR DETECTOR

FIELD OF THE INVENTION

This invention relates to radar detection devices, particularly for the detection of microwave signals present in a variety of frequency bands used by police or intrusion radar devices.

BACKGROUND OF THE INVENTION

Radar detectors have been known for some considerable time. Police radar devices that are used in the detection and measuring the speed of moving vehicles, and also intrusion and zone security devices that are used on buildings, operate in various frequency bands, often depending on the country in which they are operating. For example, in North America it is common for police devices to operate in the X band, at 10.525 gHz, and the K band at 24.150 gHz. In Europe, however, police devices may operate in very different bands.

Radar detectors have been developed for a variety of purposes and are subject to laws in various countries concerning suppression of their own emissions, since such emissions are undesirable — especially in causing interference with the operation of other devices.

Detectors which are sensitive over broad bands of radar frequencies and sensitive to frequencies in more than one band, may cause special problems in this regard. Examples of such devices are described U.S. Pat. No. 4,630,054 issued Dec. 16th 1986 to Martinson, and in copending applications Nos. 242,540 and 242,533, each in the name of Martinson, each filed of even date herewith.

The reasons for the special problems are two-fold. Firstly, if a single horn antenna is used to pick up a broad band or several bands of frequencies, a large amount of filtering is required. Secondly, where several bands are to be monitored, a plurality of local oscillators may be used, all of which have emissions which must be shielded.

The problem is not so acute if a horn antenna is used which has a cutoff frequency above that of the local oscillators.

The present invention aims to provide a radar detection device capable of detecting frequencies in more than one frequency band, and having improved characteristics regarding microwave local oscillator leakage therefrom.

BRIEF DISCUSSION OF THE INVENTION

The present invention provides a radar detection device for detecting frequencies in a plurality of frequency bands. The device comprises a plurality of horn antennae. Each antenna is specific to frequencies in one or more of the bands, and these frequencies pass to a microstrip line. A plurality of local oscillators is provided associated with the waveguide, each local oscillator being selected to produce an intermediate signal of similar frequency when mixed, at its fundamental frequency and/or twice its fundamental frequency, with signals received by a respective antenna. A single mixer is common to the antennae and the local oscillators, and signal processing circuitry is provided to further process said intermediate signals to actuate alarm means upon detection of a signal at any of the selected frequencies.

The invention especially concerns a radar detection device for detecting frequencies in the X-band, the K-band and the Ka-band. In this case there are two horn antennae, one antenna being specific to frequencies in the X-band and the other antenna being specific to frequencies in the K-band and Ka-band. There are two local oscillators, one local oscillator being selected to produce a similar intermediate signal when its fundamental frequency is mixed with X-band frequency and when twice its fundamental frequency is mixed with K-band frequency, and the other local oscillator being selected to produce a similar intermediate signal when twice its fundamental frequency is mixed with frequency from the Ka-band.

When a horn antenna for the X-band at 10.525 gHz is present, it is of larger dimensions than that for the K-band at 24.150 gHz. Thus, its lower cutoff frequency presents greater potential for leakage of local oscillator frequencies from the device. This may be guarded against in the case of the X-band antenna, and other larger dimension antenna, by the provision of a band-pass filter inhibiting leakage of local oscillator frequencies from the antenna. The band-pass filter may be a sharp, narrow band-pass filter inserted between the antenna and the mixer.

BRIEF DESCRIPTION OF THE DRAWING

A specific embodiment of the invention will now be described by way of illustration with reference to the drawing, in which the single Figure is a schematic sketch of an arrangement of two horn antennae, two local oscillators, and a mixer, in a device embodying the invention.

DETAILED DESCRIPTION OF THE PREFERRED EMBODIMENT

Figure 1:
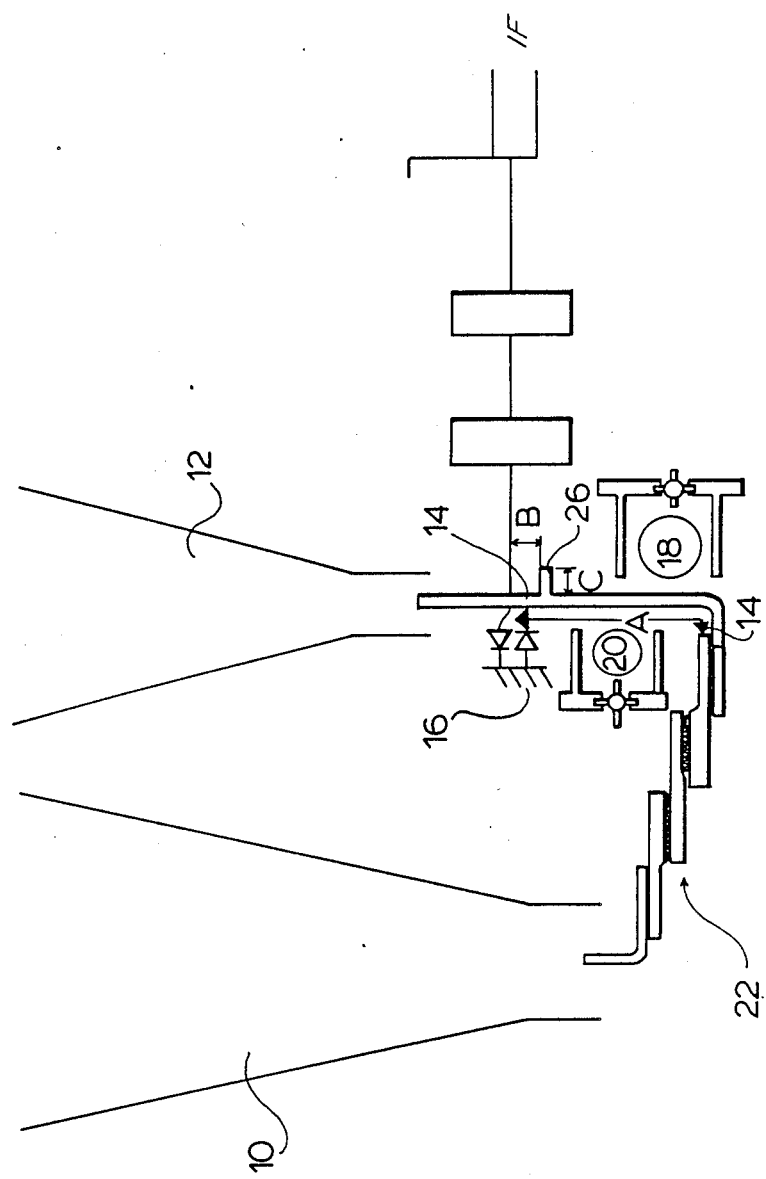

The drawing shows an X-band horn antenna 10 to receive frequencies in the X-band, and a K-band horn antenna 12 to receive frequencies in the K-band and the Ka-band. Both horns 10 and 12 are directed to receive radiation from the same direction.

A feedline 14 feeds signals from the horns 10 and 12 to a mixer 16. The feedline 14 is also electromagnetically coupled to local oscillators 18 and 20.

The frequency of local oscillator 18 is chosen such that;

$$F18 = FX + FIF$$
$$= \frac{FK - FIF}{2}$$

where: F18 is the frequency of local oscillator 18, FX is the frequency of the X-band and is 10.525 gHz, FK is the frequency of the K-band and is 24.150 gHz, and FIF is the intermediate frequency. F18 is calculated as 11.558 gHz, and thereafter FIF is found to be 1.033 gHz.

The frequency of local oscillator 20 is chosen such that;

$$F20 = \frac{FKa - FIF}{2}$$

where: F20 is the frequency of local oscillator 20, FKa is the frequency of the Ka-band and is 34.360 gHz, and FIF is the intermediate frequency — which is 1.033 gHz. Thus, F20 is found to be 16.6635 gHz.

The local oscillators 18 and 20 are chosen accordingly.

The larger horn 10 is to be used for X-band frequencies only. Therefore, it is not necessary that it be conductive at other frequencies. A sharp, narrow band-pass filter 22 at the X-band frequency is inserted between horn 10 and mixer 16, which inhibits radiation of local oscillator signals from the horn 10. Thus, signals from either local oscillator 18 (at 11.558 gHz) or local oscillator 20 (at 16.6635 gHz) are not capable of being transmitted back through the band pass filter 22 (at 10.525 gHz); and thus undesirable leakage of either local oscillator frequency signal from the horn antenna 10 is precluded.

The smaller horn 12 may also be provided with additional measures for the inhibition of signals that might be radiated therefrom. In this case, the waveguide cut off of the horn may be chosen to be below the frequency of the K-band, which the horn is required to receive and conduct, and above the frequency of the local oscillator 20. For example, in the light of the above calculations, the wave guide cut off may suitably be at around 19 gHz, resulting in considerable suppression of leakage from the K-band horn 12.

The horns 10 and 12 may be arranged so that their signals are fed to opposing ends of the feed line 14 to approach the mixer 16 from opposite directions, as shown, thus providing good isolation of the radar frequencies.

The present invention also provides a much greater opportunity for impedance matching at the individual frequencies for which the device is designed to be particularly receptive, as well as to the specific local oscillator frequencies. For example, if the distance A from the mixer 16 to the open end of the band-pass filter 22 is a multiple of half wave lengths at the K-band frequency, additional loss of K-band signal is further prevented due to the high impedance presented to the K-band frequency by the X-band feedline leg as measured at mixer 16.

Additional loss of signal may also be prevented through the use and positioning of a high impedance (open circuited) stub 26. This stub 26 may project from the feed line 14 at a distance B from the mixer along the X-band feed line leg. The stub 26 may itself have a length C. When both distance B and length C are each an odd multiple of quarter wavelengths of the Ka-band frequency, a high impedance check for K-band signal is created at the mixer 16, and additional loss of signal is further prevented.

In a different case, three local oscillators may be used to monitor radar bands containing signals of 9.41 gHz, 24.150 gHz, 9.9 gHz, 13.45 gHz and 34.36 gHz. These signals are commonly used by police radar devices in Europe. In this case, the signals may be grouped into pairs such that in one group:

$$24.150 - 2fLO = FIF$$

$$fLO - 9.41 = FIF$$

Therefore FIF=1.776 gHz and fLO (fundamental frequency for LO) =11.1866 gHz.

For the next group:

$$13.45 - 2fLO1 = FIF$$

$$fLO1 - 9.9 = FIF$$

Therefore, for an FIF of 1.776 gHz established from the first group, the fLO1 (fundamental frequency for L1) can be calculated. In fact for an FIF of 1.775 gHz — which is close enough — fLO1 is 11.675 gHz. The appropriate local oscillator may be provided in accordance with this calculation.

For the remaining frequency:

$$34.36 - 2fLO2 = FIF = 1.775 \text{ gHz}$$

Therefore fLO2 (fundamental frequency of L2)=16.292 gHz. The appropriate local oscillator is provided.

These local oscillators are chosen so that they all give a similar intermediate signal of 1.775 gHz which may conventionally be processed to provide an alarm signal which represents radar detected in any of the bands of interest. The scope of the invention is defined by the appended claims.

I claim:

1. A radar detection device for detecting frequencies in a plurality of frequency bands comprising:
    a plurality of horn antennae;
    a wave guide and microstrip line for signal from said antennae;
    local oscillators associated with the microstrip line, each local oscillator being selected to produce an intermediate signal of similar frequency when mixed, at its fundamental frequency and/or twice its fundamental frequency, with signal detected by a respective antenna;
    a mixer common to the microstrip line and the local oscillators;
    and signal processing circuitry to further process said intermediate signal to actuate alarm means.

2. A radar detector as claimed in claim 1, wherein a band-pass filter is provided for at least one antenna, to inhibit leakage of local oscillator frequencies therefrom.

3. A radar detection device for detecting frequencies in the X-band, K-band and Ka-band, comprising:
    two horn antennae, one antenna being specific to frequencies in the X-band, and the other antenna being specific to frequencies in the K-band and the Ka-band;
    a waveguide and microstrip line for signal from the antennae;
    two local oscillators, one local oscillator being selected to produce a similar intermediate signal when its fundamental frequency is mixed with X-band frequency and when twice its fundamental frequency is mixed with K-band frequency, and the other local oscillator being selected to produce a similar intermediate signal when twice its fundamental frequency is mixed with frequency from the Ka-band;
    a mixer common to the antennae and the local oscillators;
    and signal processing circuitry to further process said intermediate signal to actuate alarm means.

4. A radar detection device as claimed in claim 3, wherein a band-pass filter is provided to inhibit leakage of local oscillator frequencies from said one antenna.

5. A radar detector as claimed in claim 3, including a feedline from the antennae to the mixer, the antennae being located to feed signals to the mixer from opposing ends of the feed line.

6. A radar detector as claimed in claim 5, wherein the feed line from the X-band antenna includes a bandpass filter for X-band frequencies, and having sharp roll-off characteristics at either side of the X-band frequency; and the distance along the feedline from the bandpass filter to the mixer is a multiple of half wavelengths of K-band frequency.

7. A radar detector as claimed in claim 5, wherein the feed line from the X-band antenna has a high impedance stub branching therefrom; and the distance of the stub from the mixer is an odd multiple of quarter wavelengths of the K frequency, and the length of the stub is an odd number of quarter wavelengths of the Ka frequency.

* * * * *